(12) United States Patent
Wei

(10) Patent No.: US 10,585,589 B2
(45) Date of Patent: Mar. 10, 2020

(54) DATA COLLATION METHOD, STORAGE DEVICE, STORAGE CONTROLLER, AND STORAGE ARRAY

(71) Applicant: Huawei Technologies Co., Ltd., Shenzhen (CN)

(72) Inventor: Mingchang Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/991,752

(22) Filed: May 29, 2018

(65) Prior Publication Data

US 2018/0275888 A1    Sep. 27, 2018

Related U.S. Application Data

(63) Continuation of application No. PCT/CN2016/073062, filed on Feb. 1, 2016.

(51) Int. Cl.
*G06F 12/08* (2016.01)
*G06F 3/06* (2006.01)
(Continued)

(52) U.S. Cl.
CPC ............ *G06F 3/0608* (2013.01); *G06F 3/064* (2013.01); *G06F 3/0611* (2013.01);
(Continued)

(58) Field of Classification Search
CPC ...... G06F 3/06; G06F 3/0608; G06F 12/0238; G06F 12/0246
See application file for complete search history.

(56) References Cited

U.S. PATENT DOCUMENTS 7,571,275 B2 * 8/2009 Nelson ................ G06F 12/0246
365/185.33
2008/0148004 A1 * 6/2008 Iren ..................... G06F 12/0238
711/170
(Continued)

FOREIGN PATENT DOCUMENTS

CN   102063377 A   5/2011
CN   102662856 A   9/2012
(Continued)

OTHER PUBLICATIONS

Foreign Communication From a Counterpart Application, Chinese Application No. 201680000398.6, Chinese Search Report dated Jul. 2, 2018, 2 pages.
(Continued)

*Primary Examiner* — Ryan Bertram
*Assistant Examiner* — Trang K Ta
(74) *Attorney, Agent, or Firm* — Conley Rose, P.C.

(57) ABSTRACT

A data collation method in a storage array including reading first data from a first logical address without decompression, assigning, by a storage controller, a second logical address to the first data, storing the first data to the second logical address, establishing, by the storage controller, a mapping relationship between an address of a storage array and the second logical address, where the first logical address is mapped to a first physical address of a storage device, a length of the first physical address is equal to a length of first data, a length of the first logical address is equal to a length of second data, and the first data is compressed data of the second data, and receiving, by the storage controller, the first data from the storage device.

21 Claims, 8 Drawing Sheets

(51) Int. Cl.
*G06F 12/02* (2006.01)
*G06F 12/06* (2006.01)

(52) U.S. Cl.
CPC .......... *G06F 3/0638* (2013.01); *G06F 3/0652* (2013.01); *G06F 3/0679* (2013.01); *G06F 12/02* (2013.01); *G06F 12/0646* (2013.01); *G06F 2212/1024* (2013.01); *G06F 2212/1044* (2013.01); *G06F 2212/214* (2013.01); *G06F 2212/217* (2013.01); *G06F 2212/2146* (2013.01); *G06F 2212/261* (2013.01); *G06F 2212/401* (2013.01); *G06F 2212/7201* (2013.01); *G06F 2212/7205* (2013.01)

(56) References Cited

U.S. PATENT DOCUMENTS

| | | |
|---|---|---|
| 2011/0119455 A1 | 5/2011 | Tsai et al. |
| 2012/0290798 A1 | 11/2012 | Huang et al. |
| 2013/0151770 A1 | 6/2013 | Hara et al. |
| 2014/0114936 A1 | 4/2014 | Araki et al. |
| 2016/0004642 A1* | 1/2016 | Sugimoto .................. G06F 3/06 711/128 |
| 2016/0062885 A1* | 3/2016 | Ryu .................... G06F 12/0246 711/103 |

FOREIGN PATENT DOCUMENTS

| | | |
|---|---|---|
| CN | 103136109 A | 6/2013 |
| CN | 103620564 A | 3/2014 |
| CN | 105723320 A | 6/2016 |
| EP | 0587437 A2 | 3/1994 |
| WO | 2015199577 A1 | 12/2015 |

OTHER PUBLICATIONS

Foreign Communication From a Counterpart Application, Chinese Application No. 201680000398.6, Chinese Office Action dated Jul. 11, 2018, 3 pages.
Foreign Communication From a Counterpart Application, European Application No. 16888623.2, Extended European Search Report dated Nov. 13, 2018, 11 pages.
Machine Translation and Abstract of Chinese Publication No. CN102662856, Sep. 12, 2012, 13 pages.
Machine Translation and Abstract of Chinese Publication No. CN103136109, Jun. 5, 2013, 9 pages.
Machine Translation and Abstract of Chinese Publication No. CN105723320, Jun. 29, 2016, 24 pages.
Foreign Communication From a Counterpart Application, PCT Application No. PCT/CN2016/073062, English Translation of International Search Report dated Oct. 28, 2016, 2 pages.

* cited by examiner

DATA COLLATION METHOD, STORAGE DEVICE, STORAGE CONTROLLER, AND STORAGE ARRAY

CROSS-REFERENCE TO RELATED APPLICATIONS

This application is a continuation of International Patent Application No. PCT/CN2016/073062 filed on Feb. 1, 2016, which is hereby incorporated by reference in its entirety.

TECHNICAL FIELD

The present disclosure relates to the storage field, and in particular, to a data collation method, a storage device, a storage controller, and a storage array.

BACKGROUND

A storage array includes a storage controller and a storage device. With development of storage technologies, a storage device that supports a data compression function emerges, for example, a solid state disk (SSD) or a shingled magnetic recording (SMR) hard disk. After receiving data sent by the storage controller in the storage array, the storage device that supports the data compression function compresses the data, and writes compressed data into a storage medium.

To make distribution of data in the storage device more proper, the storage controller collates the data stored in the storage device, that is, the storage controller reads the data from the storage device, and then writes the data into a new physical address of the storage device. When receiving a data read instruction sent by the storage controller, the storage device needs to first read the compressed data from the storage medium, decompress the compressed data, and send, to the storage controller, data obtained from the decompression operation. This results in low data collation efficiency.

SUMMARY

An objective of the present disclosure is to provide a data collation method, a storage device, a storage controller, and a storage array in order to resolve a problem of low data collation efficiency.

To achieve the foregoing objective, the present disclosure uses the following technical solutions.

According to a first aspect, a data collation method is provided and is applied to a storage array, the storage array includes a storage controller and a storage device, and the method includes sending, by the storage controller, a first read instruction to the storage device, where the first read instruction includes a first logical address and a no-decompression flag, first data is stored in a first physical address of the storage device, the first logical address is mapped to the first physical address, a length of the first logical address is equal to a length of second data, a length of the first physical address is equal to a length of the first data, the first data is compressed data of the second data, and an address of the storage array is mapped to the first logical address, receiving, by the storage controller, the first data sent by the storage device, assigning, by the storage controller, a second logical address to the first data, and sending a write instruction to the storage device, where the write instruction includes the second logical address and the first data, and a length of the second logical address is equal to the length of the first data, and establishing, by the storage controller, a mapping relationship between the address of the storage array and the second logical address.

In the first aspect of the present disclosure, during data collation, the storage device sends the first data (compressed data) to the storage controller without decompressing the first data, and further, the storage device does not need to re-compress written data such that data collation efficiency is improved.

In addition, the storage device compresses data sent by the storage controller, and stores compressed data, and the storage controller can be aware of only the length of the first logical address occupied by the data in the storage device, but is not aware of the length of the actual first physical address. Therefore, the length of the first logical address occupied by the second data, recorded by the storage controller, is greater than the length of the first physical address occupied by the first data in the storage device. As such, for example, for the storage controller, data with a length of 1 megabyte (MB) occupies a storage address of 1 MB in the storage device. If a total physical address length of the storage device is 1 terabyte (TB), when recording that a used logical address length of the storage device is 1 TB, the storage controller determines that the storage device is full, and no more data can be written into the storage device. However, an actually used physical address length of the storage device may be only 512 gigabyte (GB). It may be learned that, when a length of a logical address occupied by data, recorded by the storage controller, is greater than a length of a physical address that is actually occupied by the data, the storage controller cannot make full use of physical addresses of the storage device. However, in the method described in the first aspect, the storage controller may assign the second logical address to the first data after receiving the first data sent by the storage device. Because the length of the second logical address is equal to a length of a second physical address that is actually occupied by the first data, in the data collation method in the first aspect of the present disclosure, a problem that the storage controller cannot make full use of physical addresses of the storage device is avoided, and storage space utilization is improved. Therefore, in the first aspect, the method further includes determining, by the storage controller, the length of the first data sent by the storage device, and assigning the second logical address according to the length of the first data, where the length of the second logical address is equal to the length of the first data.

In the first aspect of the present disclosure, the storage controller sends, to the storage device, a write instruction that includes the first logical address and the second data, and the storage device receives the write instruction that is sent by the storage controller and that includes the first logical address and the second data. The storage device compresses the second data to obtain the first data, and stores the first data in the first physical address. The storage device establishes a mapping relationship between the first logical address and the first physical address. When decompressing the first data, the storage device obtains the second data.

With reference to the first aspect, in a first possible implementation of the first aspect, the method further includes marking, by the storage controller, the second logical address as an address for storing compressed data. The second logical address is marked as the address for storing compressed data. When the storage controller subsequently provides a server with data in the second logical address, according to marked information, the storage device needs to decompress the first data to obtain the second data. Optionally, the storage controller marks, in the mapping relationship between the address of the storage array and the second logical address, the second logical address as the address for storing compressed data. In another implementation, the storage controller does not mark the second logical address as the address for storing compressed data, but determines, according to a trigger condition of a read instruction, whether the storage device needs to decompress the first data. When the storage controller sends a read instruction to the storage device for data collation, the read instruction includes a no-decompression flag. When the storage controller sends a read instruction to the storage device due to a data read instruction sent by the server, the read instruction includes a decompression flag. When being stored in the storage device, data is already compressed. Therefore, in another implementation, the read instruction sent by the storage controller to the storage device includes the no-decompression flag only when data is collated. In another scenario, the read instruction sent by the storage controller to the storage device includes only a logical address of the storage device, for example, the first logical address or the second logical address. The storage device decompresses the first data according to some other approaches operation to obtain the second data, and sends the second data to the storage controller. Optionally, the storage controller does not need to mark the second logical address as the address for storing compressed data. Further, if the storage controller determines that the address of the storage array is not equal to the second logical address, the storage controller determines the second logical address as the address for storing compressed data.

With reference to the first aspect or the first possible implementation of the first aspect, in a second possible implementation of the first aspect, the method further includes sending, by the storage controller, a data erasure instruction to the storage device, where the data erasure instruction includes the first logical address. In this way, after the storage device erases, according to the data erasure instruction, the first data stored in the first physical address, the storage device may write new data into the first physical address, that is, the storage controller uses the first logical address as an idle address.

With reference to any one of the first aspect or the foregoing possible implementations of the first aspect, in a third possible implementation of the first aspect, the method further includes receiving, by the storage controller, a data read instruction sent by a server, where the data read instruction includes the address of the storage array, sending, by the storage controller, a second read instruction to the storage device according to the data read instruction, where the second read instruction includes the second logical address and a decompression flag, receiving, by the storage controller, the second data sent by the storage device, and sending, by the storage controller, the second data to the server. In the foregoing possible implementation, it is ensured that the storage controller correctly sends the second data to the server. In another implementation, the method further includes receiving, by the storage controller, a data read instruction sent by a server, where the data read instruction includes the address of the storage array, sending, by the storage controller, a second read instruction to the storage device according to the data read instruction, where the second read instruction includes the second logical address, receiving, by the storage controller, the second data sent by the storage device, and sending, by the storage controller, the second data to the server. Correspondingly, the storage device decompresses the first data by default.

With reference to any one of the first aspect or the foregoing possible implementations of the first aspect, in a fourth possible implementation of the first aspect, the method further includes determining, by the storage controller, the first logical address as an address for storing compressed data before sending the first read instruction to the storage device. Therefore, the storage controller adds the no-decompression flag to the read instruction such that the storage device does not decompress the first data, and data collation efficiency is improved. Optionally, determining, by the storage controller, the first logical address as an address for storing compressed data includes determining, by the storage controller, the first logical address as the address for storing uncompressed data if the storage controller determines that a length of the address of the storage array is equal to the length of the first logical address. Optionally, the storage controller marks the first logical address as the address for storing compressed data. Further, the storage controller marks, in a mapping relationship between the address of the storage array and the first logical address, the first logical address as the address for storing uncompressed data.

In some possible implementations, the method further includes determining, by the storage controller, the first logical address as an address for storing valid data before sending the first read instruction to the storage device. That is, the storage controller may collate valid data in the storage device such that a data collation amount is reduced, and this helps improve data collation efficiency.

According to a second aspect, a data collation method is provided, applied to a storage array, where the storage array includes a storage controller and a storage device, and the method includes receiving, by the storage device, a first read instruction sent by the storage controller, where the first read instruction includes a first logical address and a no-decompression flag, first data is stored in a first physical address of the storage device, the first logical address is mapped to the first physical address, a length of the first logical address is equal to a length of second data, a length of the first physical address is equal to a length of the first data, the first data is compressed data of the second data, and an address of the storage array is mapped to the first logical address, sending, by the storage device, the first data to the storage controller according to the first read instruction, receiving, by the storage device, a write instruction sent by the storage controller, where the write instruction includes a second logical address and the first data, and a length of the second logical address is equal to the length of the first data, writing, by the storage device, the first data into a second physical address, and establishing, by the storage device, a mapping relationship between the second logical address and the second physical address.

In the second aspect of the present disclosure, during data collation, the storage device sends the first data (compressed data) to the storage controller without decompressing the first data, and further, the storage device does not need to re-compress written data such that data collation efficiency is improved.

Using the solution described in the second aspect, the storage controller may assign the second logical address to the first data after receiving the first data sent by the storage device. Because the length of the second logical address is equal to a length of the second physical address that is actually occupied by the first data, in the data collation method in the second aspect of the present disclosure, a problem that the storage controller cannot make full use of physical addresses of the storage device is avoided, and storage space utilization is improved. Therefore, in the second aspect, the method further includes determining, by the storage controller, the length of the first data sent by the storage device, and assigning the second logical address according to the length of the first data, where the length of the second logical address is equal to the length of the first data.

With reference to the second aspect, in a first possible implementation of the second aspect, the method further includes receiving, by the storage device, a data erasure instruction sent by the storage controller, where the data erasure instruction includes the first logical address, erasing, by the storage device according to the data erasure instruction, the first data stored in the first physical address, and deleting a mapping relationship between the first logical address and the first physical address. In this way, after the storage device erases, according to the data erasure instruction, the first data stored in the first physical address, the storage device may write new data into the first physical address, that is, the storage controller uses the first logical address as an idle address.

With reference to the second aspect or the first possible implementation of the second aspect, in a second possible implementation of the second aspect, the method further includes receiving, by the storage device, a second read instruction sent by the storage controller, where the second read instruction includes the second logical address and a decompression flag, decompressing, by the storage device, the first data according to the second read instruction to obtain the second data, and sending the second data to the storage controller.

In the foregoing possible implementation, it is ensured that the storage controller correctly sends the second data to a server. In another implementation, the method further includes receiving, by the storage device, a second read instruction sent by the storage controller, where the second read instruction includes the second logical address, and the second read instruction is sent by the storage controller after the storage controller receives a data read instruction that includes the address of the storage array, decompressing, by the storage device, the first data to obtain the second data, and sending, by the storage device, the second data to the storage controller. That is, the storage device decompresses the first data by default.

According to a third aspect, a storage controller applied to a storage array is provided, the storage array further includes a storage device, and the storage controller is configured to execute the method in the first aspect or any possible implementation of the first aspect. In an implementation, further, the storage controller includes units that are configured to execute the method in the first aspect or any possible implementation of the first aspect. In another implementation, the storage controller includes a processor, an interface, and a communications bus, the processor and the interface communicate via the communications bus, and the processor is configured to execute the method in the first aspect or any possible implementation of the first aspect. The processor is configured to execute the method in the first aspect or any possible implementation of the first aspect via the interface.

According to a fourth aspect, a storage device applied to a storage array is provided, the storage array further includes a storage controller, and the storage device is configured to execute the method in the second aspect or any possible implementation of the second aspect. In an implementation, further, the storage device includes units that are configured to execute the method in the second aspect or any possible implementation of the second aspect. In an implementation, further, the storage device includes a processor, an interface, and a communications bus, the processor and the interface communicate via the communications bus, and the processor is configured to execute the method in the second aspect or any possible implementation of the second aspect. Further, the processor is configured to execute the method in the second aspect or any possible implementation of the second aspect via the interface.

According to a fifth aspect, a storage array is provided, and includes a storage controller and a storage device. The storage controller is configured to execute the method in the first aspect or any possible implementation of the first aspect. Correspondingly, the storage device is configured to execute the method in the second aspect or any possible implementation of the second aspect.

According to a sixth aspect, a computer readable medium is provided, configured to store a computer program, and the computer program includes an instruction used to execute the method in the first aspect or any possible implementation of the first aspect.

According to a seventh aspect, a computer readable medium is provided, configured to store a computer program, and the computer program includes an instruction used to execute the method in the second aspect or any possible implementation of the second aspect.

Based on the implementations provided in the foregoing aspects, in the present disclosure, the implementations may be further combined to provide more implementations.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

A storage device described in this specification is a storage device that can compress data, for example, one or more SSDs, or one or more hard disks of another type and storage cards and a combination thereof that support data compression.

Figure 1:
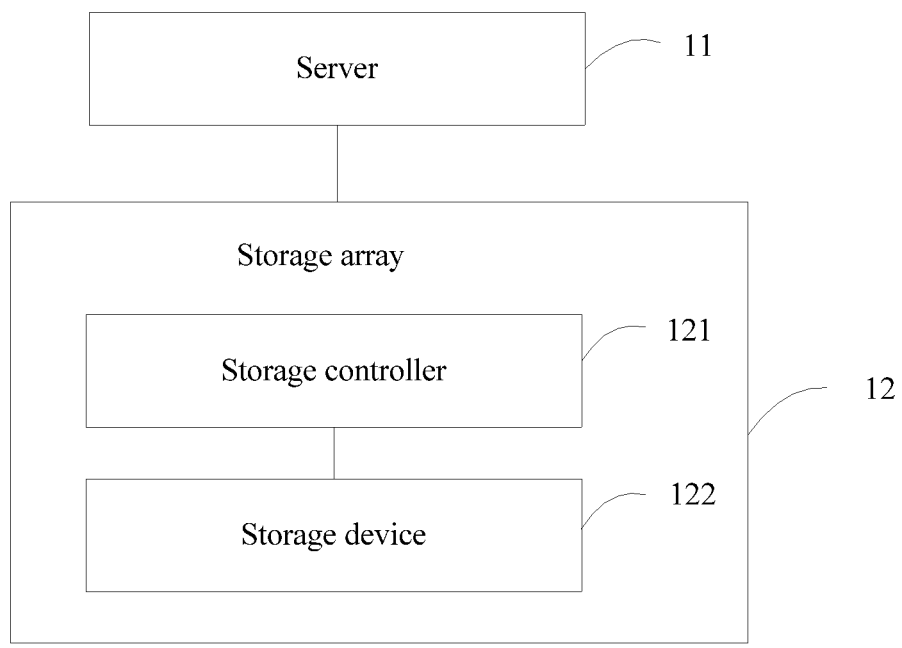
FIG. 1 is a schematic architectural diagram of a storage array according to an embodiment of the present disclosure.

FIG. 1 is an architectural diagram of a storage array 12 in an embodiment of the present disclosure. The storage array 12 includes a storage controller 121 and a storage device 122. A server 11 communicates with the storage array 12, and the storage controller 121 communicates with the storage device 122.

Data collation may mean that the storage controller 121 performs space reclaiming or defragmentation on the storage device 122. The space reclaiming means that valid data in an original address in which invalid data is stored in the storage device 122 is stored in a new address. The defragmentation means that a data fragment stored in an address in the storage device 122 is stored in a new address.

The following describes the technical solutions in the embodiments of the present disclosure with reference to the accompanying drawings in the embodiments of the present disclosure.

Figure 2:
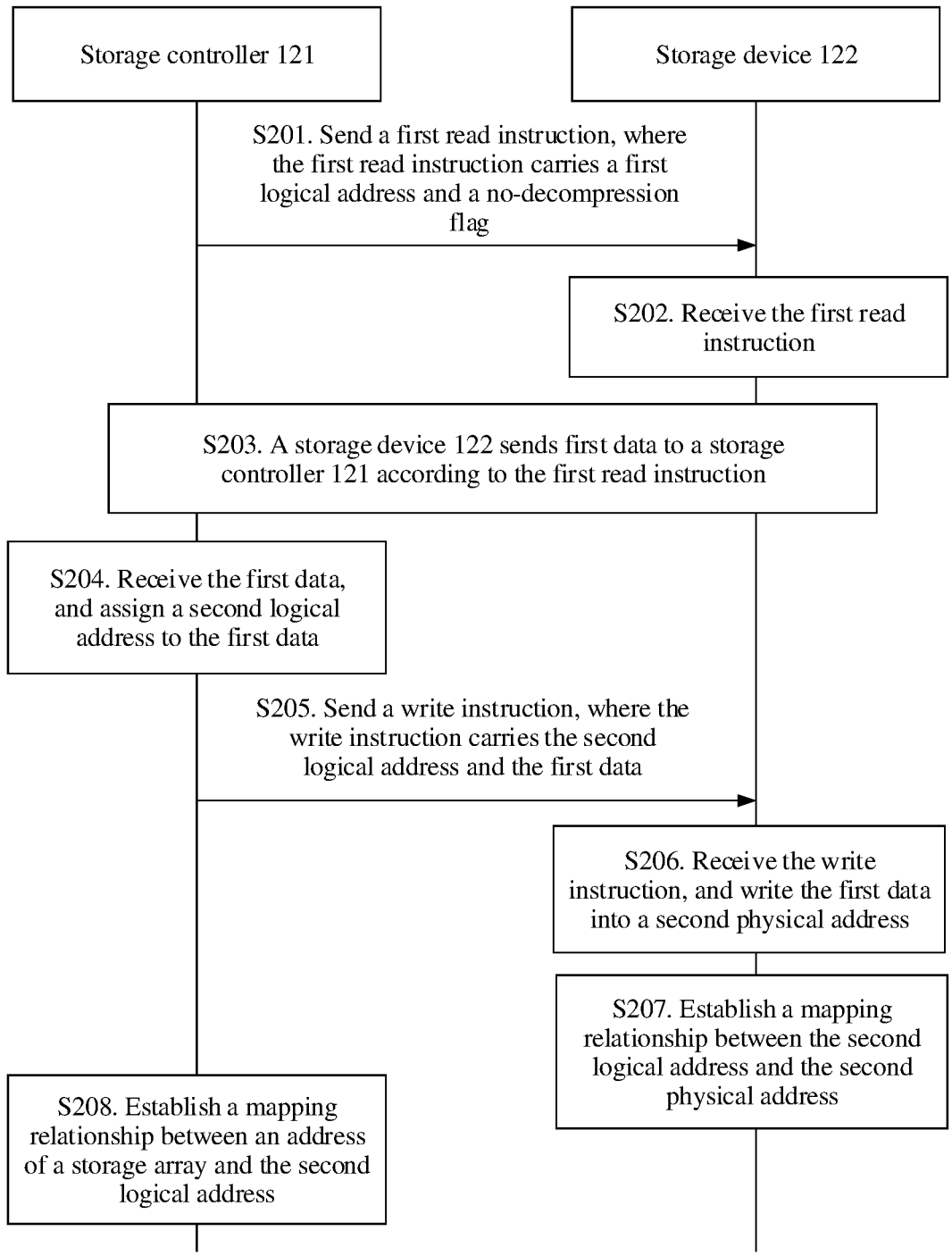
FIG. 2 is a schematic flowchart of a data collation method for a storage array according to an embodiment of the present disclosure.

With reference to FIG. 1, an embodiment of the present disclosure provides a data collation method. The storage array 12 includes the storage controller 121 and the storage device 122. As shown in FIG. 2, the method includes the following steps.

Step S201. The storage controller 121 sends a first read instruction to the storage device 122, where the first read instruction includes a first logical address and a no-decompression flag.

First data is stored in a first physical address of the storage device 122, the first data is compressed data of second data, the first logical address is mapped to the first physical address, a length of the first logical address is equal to a length of the second data, a length of the first physical address is equal to a length of the first data, and an address of the storage array 12 is mapped to the first logical address. The first data is the compressed data of the second data, that is, the storage device 122 receives the second data sent by the storage controller 121, compresses the second data to obtain the first data, and stores the first data in the first physical address.

As shown in FIG. 1, the server 11 can be aware of only the address of the storage array 12, that is, the storage array 12 presents the address of the storage array 12 to the server 11. The address of the storage array 12 is a storage address that the server 11 can access. The storage controller 121 can be aware of a logical address of the storage device 122, that is, the storage device 122 presents the logical address to the storage controller 121. When the storage controller 121 receives a data write instruction that is sent by the server 11 and that includes the address of the storage array 12 and to-be-written data, the storage controller 121 selects, according to a length of the to-be-written data, the logical address of the storage device 122 to store the to-be-written data. Therefore, the length of the first logical address is equal to the length of the second data. After receiving the second data, the storage device 122 compresses the second data to obtain the first data, and stores the first data in the first physical address. Therefore, the length of the first physical address is equal to the length of the first data.

Step S202. The storage device 122 receives the first read instruction.

Step S203. The storage device 122 sends first data to the storage controller 121 according to the first read instruction.

Further, the storage device 122 may determine the first physical address by querying, according to the first logical address in the first read instruction, mapping relationships that are recorded by the storage device 122 and that are between logical addresses and physical addresses. In this way, the storage device 122 does not decompress the first data according to the no-decompression flag carried in the first read instruction, but directly sends the first data to the storage controller 121.

Step S204. The storage controller 121 receives the first data sent by the storage device 122, and assigns a second logical address to the first data.

Further, the storage controller 121 determines the length of the first data, and assigns the second logical address according to the length of the first data. In this way, a length of the second logical address is equal to the length of the first data.

Step S205. The storage controller 121 sends a write instruction to the storage device 122, where the write instruction includes the second logical address and the first data.

Step S206. The storage device 122 receives the write instruction, and writes the first data into a second physical address.

Step S207. The storage device 122 establishes a mapping relationship between the second logical address and the second physical address.

Step S208. The storage controller 121 establishes a mapping relationship between an address of the storage array and the second logical address.

Optionally, the storage controller 121 may establish the mapping relationship between the address of the storage array 12 and the second logical address after receiving a message sent by the storage device 122 indicating that data is successfully written.

In the foregoing method, the first data is the compressed data of the second data. That is, for compressed data stored in the storage device 122, the storage controller 121 may directly read the compressed data, and the storage device 122 does not need to decompress the compressed data. In addition, when the storage controller 121 sends the compressed data to the storage device 122, the storage device 122 does not need to perform data compression. Therefore, data collation efficiency is improved.

In addition, the storage device 122 compresses data sent by the storage controller 121, and stores compressed data, and the storage controller 121 can be aware of only the length of the first logical address occupied by the data in the storage device 122, but is not aware of the length of the actual first physical address. Therefore, the length of the first logical address occupied by the second data, recorded by the storage controller 121, is greater than the length of the first physical address occupied by the first data in the storage device 122. As such, for example, for the storage controller 121, data with a length of 1 MB occupies a storage address of 1 MB in the storage device 122. If a total physical address length of the storage device 122 is 1 TB, when recording that a used logical address length of the storage device 122 is 1 TB, the storage controller 121 determines that the storage device 122 is full, and no more data can be written into the storage device 122. However, an actually used physical address length of the storage device 122 may be only 512 GB. It may be learned that, when a length of a logical address occupied by data, the storage controller 121, is greater than a length of a physical address that is actually occupied by the data, the storage controller 121 cannot use all physical addresses of the storage device 122. However, in the solution described in this embodiment of the present disclosure, the storage controller 121 may assign the second logical address to the first data after receiving the first data sent by the storage device 122. Because the length of the second logical address is equal to a length of the second physical address that is actually occupied by the first data, in the data collation method in this embodiment of the present disclosure, the storage controller 121 makes full use of the physical addresses of the storage device 122 such that storage space utilization is improved.

Figure 3A:
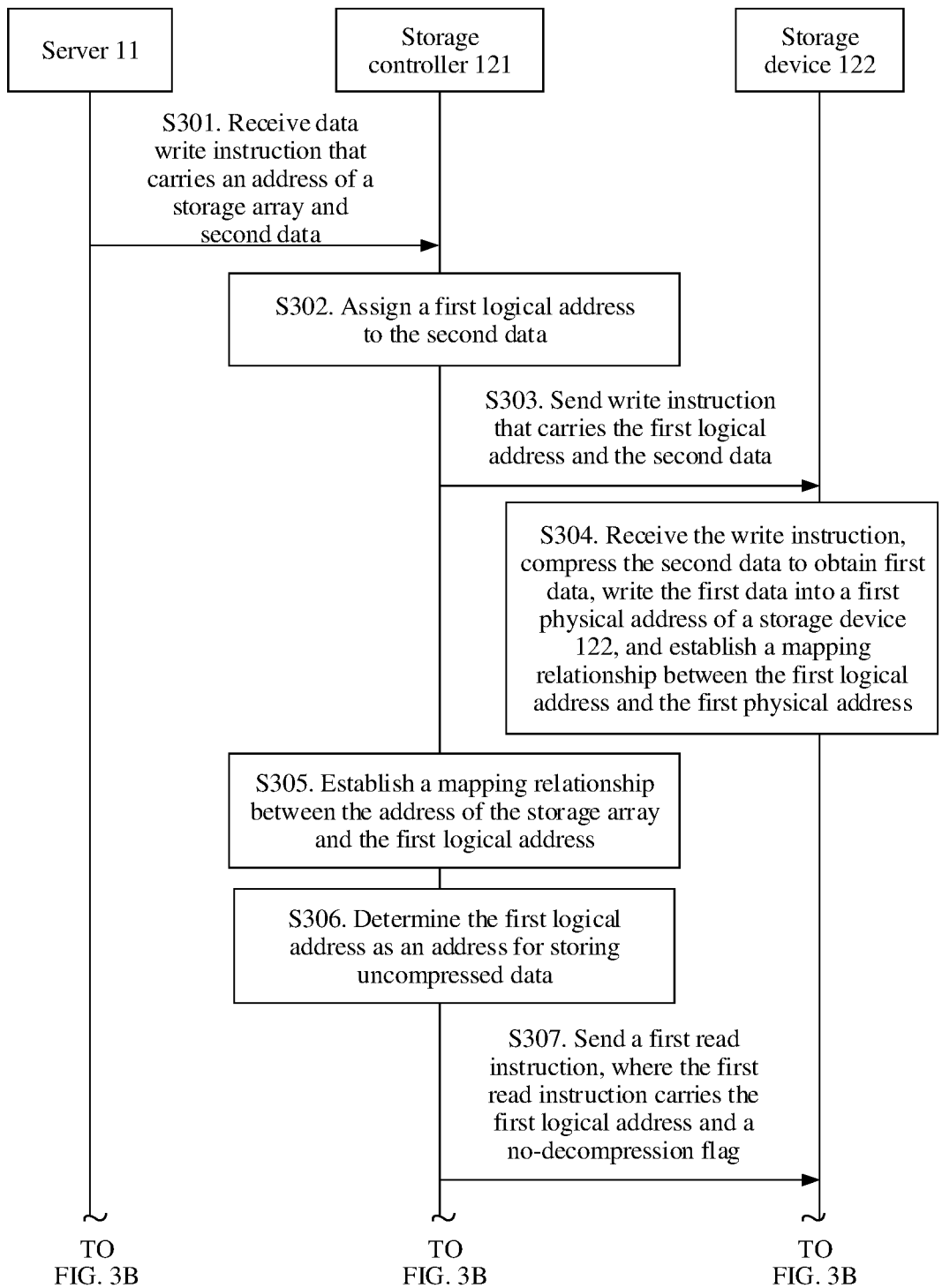
FIG. 3A, FIG. 3B and FIG. 3C are a schematic flowchart of another data collation method for a storage array according to an embodiment of the present disclosure.
Figure 3B:
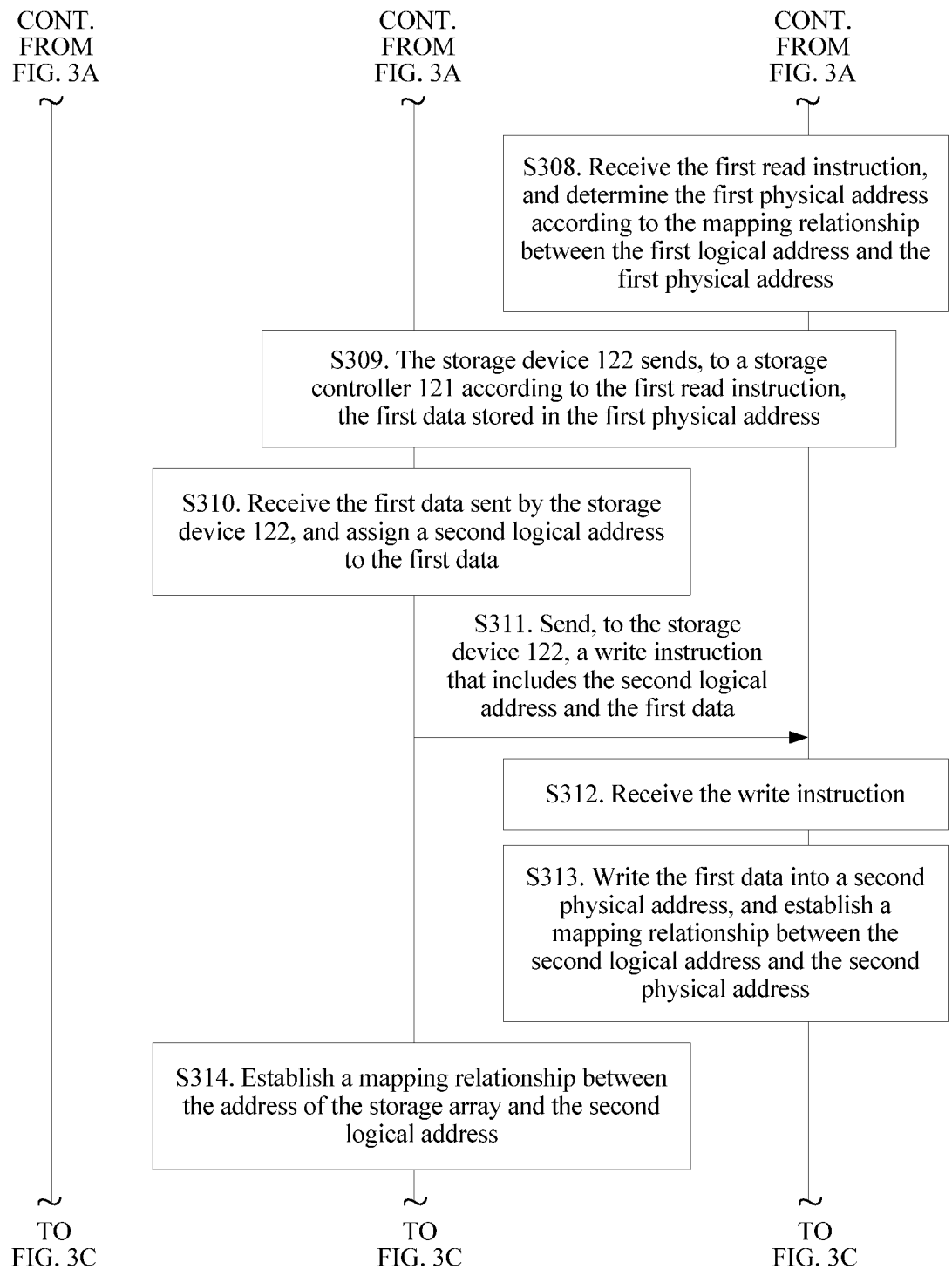
Figure 3C:
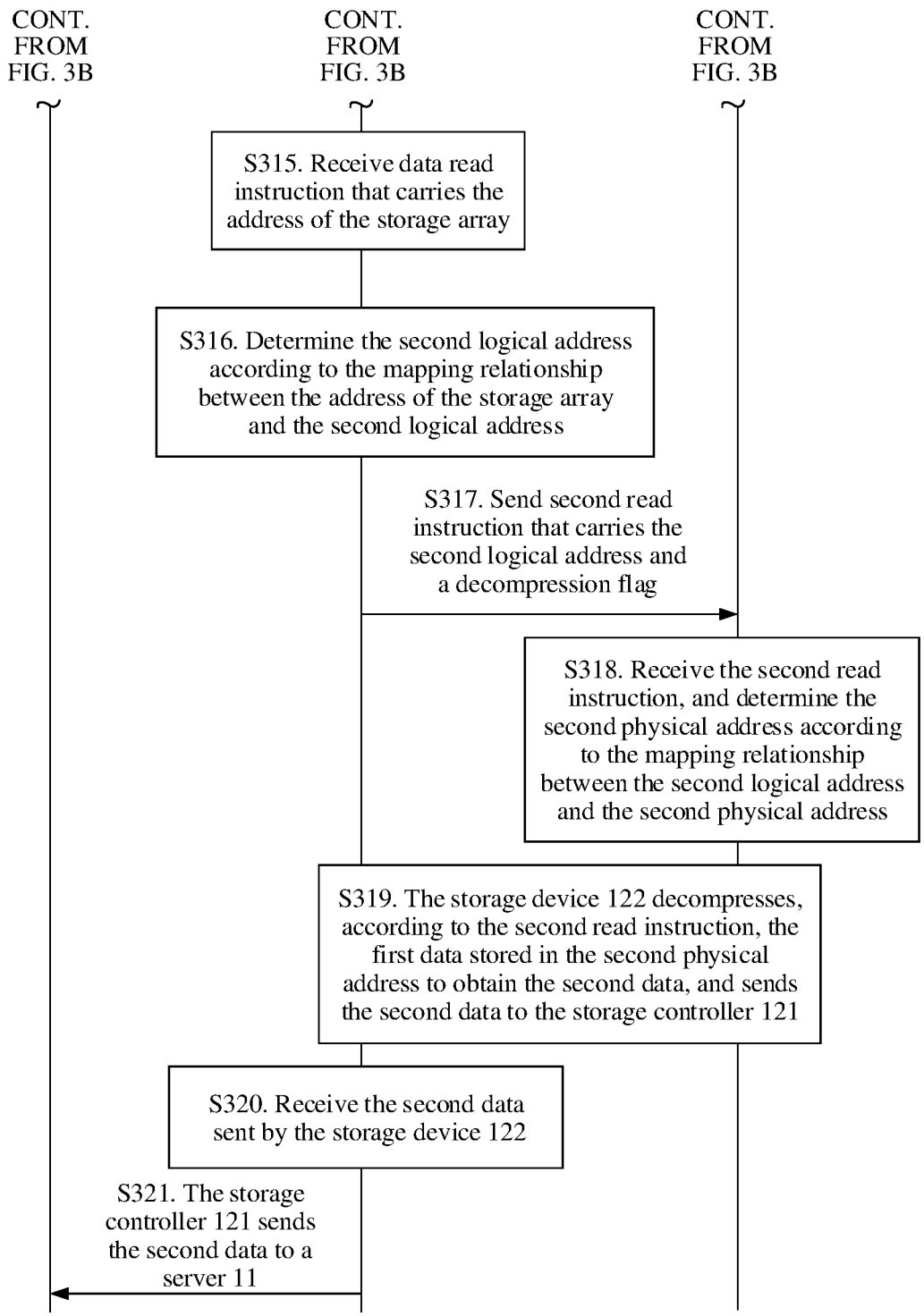

To make a person skilled in the art understand technical solutions provided in the present disclosure, the following describes, with reference to FIG. 1 using a detailed example, a data collation method for the storage array 12 provided in an embodiment of the present disclosure. As shown in FIG. 3A, FIG. 3B and FIG. 3C, the method includes the following steps.

Step S301. A storage controller 121 receives a data write instruction that is sent by a server 11 and that includes an address of the storage array and second data.

Step S302. The storage controller 121 assigns a first logical address to the second data, where a length of the first logical address is equal to a length of the second data.

Step S303. The storage controller 121 sends, to a storage device 122, a write instruction that includes the first logical address and the second data.

Step S304. The storage device 122 receives the write instruction sent by the storage controller 121, compresses the second data to obtain first data, writes the first data into a first physical address of the storage device 122, and establishes a mapping relationship between the first logical address and the first physical address, where a length of the first physical address is equal to a length of the first data.

Step S305. The storage controller 121 establishes a mapping relationship between the address of the storage array and the first logical address.

Optionally, the storage controller 121 marks the first logical address as an address for storing compressed data. Optionally, the storage controller 121 marks, in the mapping relationship between the address of the storage array and the first logical address, the first logical address as the address for storing compressed data.

Optionally, the storage controller 121 does not need to mark the first logical address as the address for storing compressed data. In specific implementation, when the storage controller 121 determines that a length of the address of the storage array is equal to the length of the first logical address, the storage controller 121 determines the first logical address as the address for storing uncompressed data.

Step S301 to step S305 are a method procedure in which the server 11 writes data into the storage device 122. Further, the storage controller 121 may initiate data collation in the following implementations.

Implementation 1: The storage controller 121 performs data collation after receiving an instruction delivered by a user.

Implementation 2: The storage controller 121 may regularly perform data collation.

Implementation 3: The storage controller 121 may perform data collation when the storage array 12 is idle in order to ensure service performance.

Optionally, the data collation method provided in this embodiment of the present disclosure includes the following steps.

Step S306. The storage controller 121 determines the first logical address as an address for storing compressed data.

That is, in a method procedure of writing the second data into the storage array 12, the storage controller 121 may mark the first logical address as the address for storing compressed data. In this way, in a data collation procedure, the storage controller 121 may perform data collation on only the address for storing compressed data. For a specific method for marking the first logical address as the address for storing compressed data, refer to the foregoing description. Optionally, step S306 may be as follows. The storage controller 121 determines the first logical address as an address for storing valid data.

Step S307. The storage controller 121 sends a first read instruction to the storage device 122, where the first read instruction includes the first logical address and a no-decompression flag.

Step S308. The storage device 122 receives the first read instruction, and determines the first physical address according to the mapping relationship between the first logical address and the first physical address.

Step S309. The storage device 122 sends, to the storage controller 121 according to the first read instruction, the first data stored in the first physical address.

Step S310. The storage controller 121 receives the first data sent by the storage device 122, and assigns a second logical address to the first data.

Optionally, the storage controller 121 determines the length of the first data, and assigns the second logical address according to the length of the first data. The length of the first data is equal to a length of the second logical address.

Optionally, the storage controller 121 marks the second logical address as an address for storing compressed data. Optionally, the storage controller 121 marks, in a mapping relationship between the address of the storage array and the second logical address, the second logical address as the address for storing compressed data.

Optionally, the storage controller 121 does not need to mark the second logical address as the address for storing compressed data. Further, if the storage controller 121 determines that the address of the storage array is not equal to the second logical address, the storage controller 121 determines the second logical address as the address for storing compressed data.

Step S311. The storage controller 121 sends, to the storage device 122, a write instruction that includes the second logical address and the first data.

Step S312. The storage device 122 receives the write instruction.

Step S313. The storage device 122 writes the first data into a second physical address, and establishes a mapping relationship between the second logical address and the second physical address.

The first data from the first physical address is stored in the second physical address by means of the foregoing steps. Optionally, after establishing the mapping relationship between the second logical address and the second physical address, the storage device 122 may further perform data erasure on the first physical address, and deletes the mapping relationship between the first logical address and the first physical address. Further, the storage device 122 receives a data erasure instruction sent by the storage controller 121, where the data erasure instruction includes the first logical address, erases, according to the data erasure instruction, the first data stored in the first physical address, and deletes the mapping relationship between the first logical address and the first physical address. In addition, optionally, the storage device 122 such as an SSD may have a data erasure function. Therefore, the storage device 122 can perform data erasure on the first physical address even if the storage controller 121 does not send the data erasure instruction. This is not limited in this embodiment of the present disclosure.

Step S314. The storage controller 121 establishes a mapping relationship between the address of the storage array and the second logical address.

In this way, after receiving a data read instruction that is sent by the server 11 and that includes the address of the storage array 12, the storage controller 121 may correctly read the second data according to the mapping relationship between the address of the storage array 12 and the second logical address. Further, the method includes the following steps.

Step S315. The storage controller 121 receives a data read instruction that is sent by the server 11 and that includes the address of the storage array.

Step S316. The storage controller 121 determines the second logical address according to the mapping relationship between the address of the storage array and the second logical address.

Step S317. The storage controller 121 sends, to the storage device 122, a second read instruction that includes the second logical address and a decompression flag.

Step S318. The storage device 122 receives the second read instruction, and determines the second physical address according to the mapping relationship between the second logical address and the second physical address.

Step S319. The storage device 122 decompresses, according to the second read instruction, the first data stored in the second physical address, to obtain the second data, and sends the second data to the storage controller 121.

Step S320. The storage controller 121 receives the second data sent by the storage device 122.

Step S321. The storage controller 121 sends the second data to the server 11.

For brief description, the foregoing method embodiment is represented as a series of actions. However, a person skilled in the art should appreciate that the present disclosure is not limited to the described order of the actions. In addition, the actions in the embodiment described in FIG. 3A, FIG. 3B and FIG. 3C are not necessarily mandatory for the present disclosure. For example, in another implementation in this embodiment of the present disclosure, the storage controller 121 does not mark the second logical address as the address for storing compressed data, but determines, according to a trigger condition of a read instruction, whether the storage device 122 needs to decompress the first data. When the storage controller 121 sends a read instruction to the storage device 122 for data collation, the read instruction includes a no-decompression flag. When the storage controller 121 sends a read instruction to the storage device 122 due to a data read instruction sent by the server 11, the read instruction includes a decompression flag. The storage device 122 in the storage array 12 has a compression function, that is, all data stored by the storage device 122 is compressed data. Therefore, in another implementation, the read instruction sent by the storage controller 121 to the storage device 122 includes the no-decompression flag only when data is collated. In another scenario, the read instruction sent by the storage controller 121 to the storage device 122 includes only a logical address of the storage device 122, for example, the first logical address or the second logical address. The storage device 122 decompresses the first data according to the other approaches operation to obtain the second data, and sends the second data to the storage controller 121. That is, the storage device 122 decompresses the first data by default. Optionally, the first logical address does not need to be marked as the address for storing compressed data, and the second logical address does not need to be marked as the address for storing compressed data.

In the foregoing method, because the storage device 122 does not need to perform decompression and re-compression on compressed data in a data collation process, data collation efficiency is improved. In addition, a logical address that is occupied by data and that is recorded by the storage controller 121 is changed from the first logical address whose address length is equal to a length of uncompressed data to the second logical address whose address length is equal to a length of compressed data. Therefore, the storage controller 121 makes full use of a physical address of the storage device 122 such that storage space utilization is improved.

Figure 4:
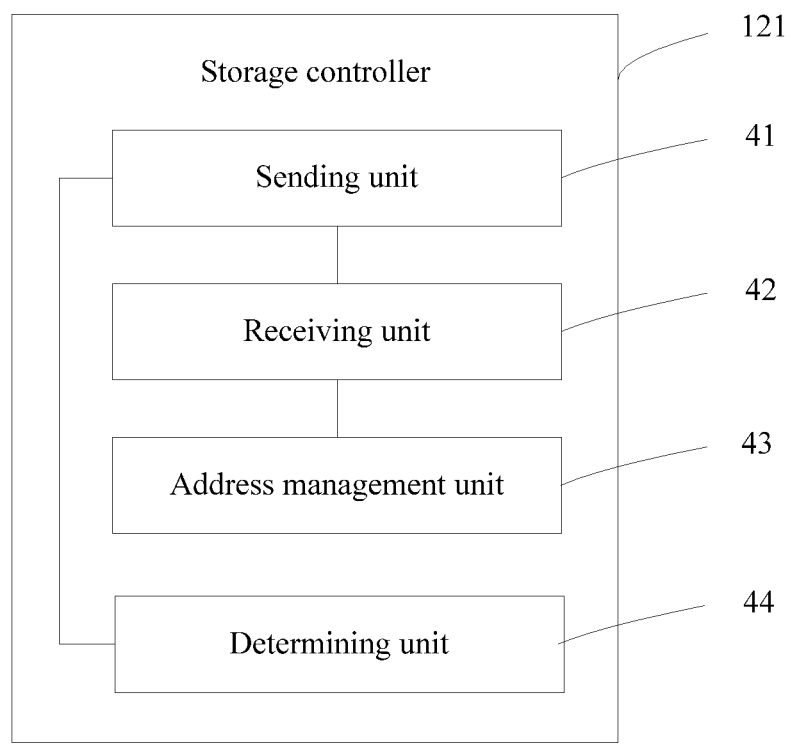
FIG. 4 is a schematic structural diagram of a storage controller according to an embodiment of the present disclosure.

An embodiment of the present disclosure further provides a storage controller 121 applied to a storage array 12. The storage array 12 further includes a storage device 122. Further, the storage controller 121 is configured to implement related method steps in the foregoing method embodiment. As shown in FIG. 4, the storage controller 121 includes a sending unit 41, a receiving unit 42, and an address management unit 43.

The sending unit 41 is configured to send a first read instruction to the storage device 122. The first read instruction includes a first logical address and a no-decompression flag.

First data is stored in a first physical address of the storage device 122, the first logical address is mapped to the first physical address, a length of the first logical address is equal to a length of second data, the first data is compressed data of the second data, a length of the first physical address is equal to a length of the first data, and an address of the storage array is mapped to the first logical address.

The receiving unit 42 is configured to receive the first data sent by the storage device 122.

The address management unit 43 is configured to assign a second logical address to the first data.

The sending unit 41 is further configured to send a write instruction to the storage device 122. The write instruction includes the second logical address and the first data, and a length of the second logical address is equal to the length of the first data.

The address management unit 43 is further configured to establish a mapping relationship between the address of the storage array and the second logical address.

The storage controller 121 may directly read compressed data in the storage device 122, and the storage device 122 does not decompress the compressed data, and does not need to perform re-compression on compressed data sent by the storage controller 121. Therefore, data collation efficiency is improved using the storage controller 121 provided in this embodiment of the present disclosure.

In the other approaches, when a length of a logical address occupied by data, recorded by a storage controller, is greater than a length of a physical address that is actually occupied by the data, the storage controller cannot make full use of physical addresses of a storage device. However, according to the storage controller 121, after receiving the first data sent by the storage device 122, the storage controller 121 may assign the second logical address to the first data. The length of the second logical address is equal to a length of a second physical address that is actually occupied by the first data. Therefore, the storage controller 121 may make full use of physical addresses of the storage device 122 such that storage space utilization is improved.

Optionally, the address management unit 43 is further configured to mark the second logical address as an address for storing compressed data. In this way, when the storage controller 121 subsequently provides a server 11 with data in the second logical address, according to marked information, the storage device 122 needs to decompress the first data to obtain the second data. Optionally, the storage controller marks, in the mapping relationship between the address of the storage array and the second logical address, the second logical address as the address for storing compressed data. In another implementation, the storage controller 121 does not mark the second logical address as the address for storing compressed data, but determines, according to a trigger condition of a read instruction, whether the storage device 122 needs to decompress the first data. When the storage controller 121 sends a read instruction to the storage device for data collation, the read instruction includes a no-decompression flag. When the storage controller 121 sends a read instruction to the storage device 122 due to a data read instruction sent by the server 11, the read instruction includes a decompression flag. When being stored in the storage device 122, data is already compressed. Therefore, in another implementation, the read instruction sent by the storage controller 121 to the storage device 122 includes the no-decompression flag only when data is collated. In another scenario, the read instruction sent by the storage controller 121 to the storage device 122 includes only a logical address of the storage device, for example, the first logical address or the second logical address. The storage device 122 decompresses the first data according to the other approaches operation to obtain the second data, and sends the second data to the storage controller.

Optionally, the receiving unit 42 is further configured to receive the data read instruction sent by the server 11, where the data read instruction includes the address of the storage array, the sending unit 41 is further configured to send a second read instruction to the storage device according to the data read instruction, where the second read instruction includes the second logical address and the decompression flag, the receiving unit 42 is further configured to receive the second data sent by the storage device 122, and the sending unit 41 is further configured to send the second data to the server 11 in order to ensure that the server 11 can correctly read the second data. In another implementation, the receiving unit 42 is further configured to receive the data read instruction sent by the server 11. The data read instruction includes the address of the storage array. The sending unit 41 is further configured to send a second read instruction to the storage device 122 according to the data read instruction. The second read instruction includes the second logical address. The receiving unit 42 is further configured to receive the second data sent by the storage device 122. The sending unit 41 is further configured to send the second data to the server 11.

Optionally, the sending unit 41 is further configured to send a data erasure instruction to the storage device 122, and the data erasure instruction includes the first logical address. That is, after the storage controller 121 stores, in the second physical address, compressed data stored in the first physical address, the storage controller 121 may further send the data erasure instruction such that the storage device 122 erases the data in the first physical address. In this way, after the storage device 122 erases, according to the data erasure instruction, the first data stored in the first physical address, the storage device 122 may write new data into the first physical address, and the storage controller 121 uses the first logical address as an idle address.

Optionally, the storage controller 121 further includes a determining unit 44, configured to determine the first logical address as an address for storing compressed data before the sending unit 41 sends the first read instruction to the storage device 122. Therefore, the storage controller 121 may add the no-decompression flag to the read instruction such that the storage device 122 does not decompress the first data, and data collation efficiency is improved. Optionally, determining the first logical address as an address for storing compressed data includes, when the determining unit 44 determines that a length of the address of the storage array is equal to the length of the first logical address, the determining unit 44 determines the first logical address as the address for storing uncompressed data. Optionally, the storage controller 121 marks the first logical address as the address for storing uncompressed data. Further, when the storage controller 121 marks, in a mapping relationship between the address of the storage array and the first logical address, the first logical address as the address for storing uncompressed data, that the determining unit 44 determines the first logical address as the address for storing uncompressed data includes that the determining unit 44 determines that the first logical address has an identifier of the address for storing uncompressed data.

It should be noted that, division for the units of the storage controller 121 is merely logical function division and may be other division in actual implementation. For example, the address management unit 43 and the determining unit 44 may be classified as a processing unit. In addition, physical implementation of the foregoing functional units may have multiple types. For example, the determining unit 44 may be a central processing unit (CPU), or may be an application-specific integrated circuit (ASIC).

In addition, it may be clearly understood by a person skilled in the art that, for the purpose of convenient and brief description, for a specific working process of each unit of the foregoing described storage controller, refer to a corresponding process in the foregoing method embodiment, and details are not described herein again.

Figure 5:
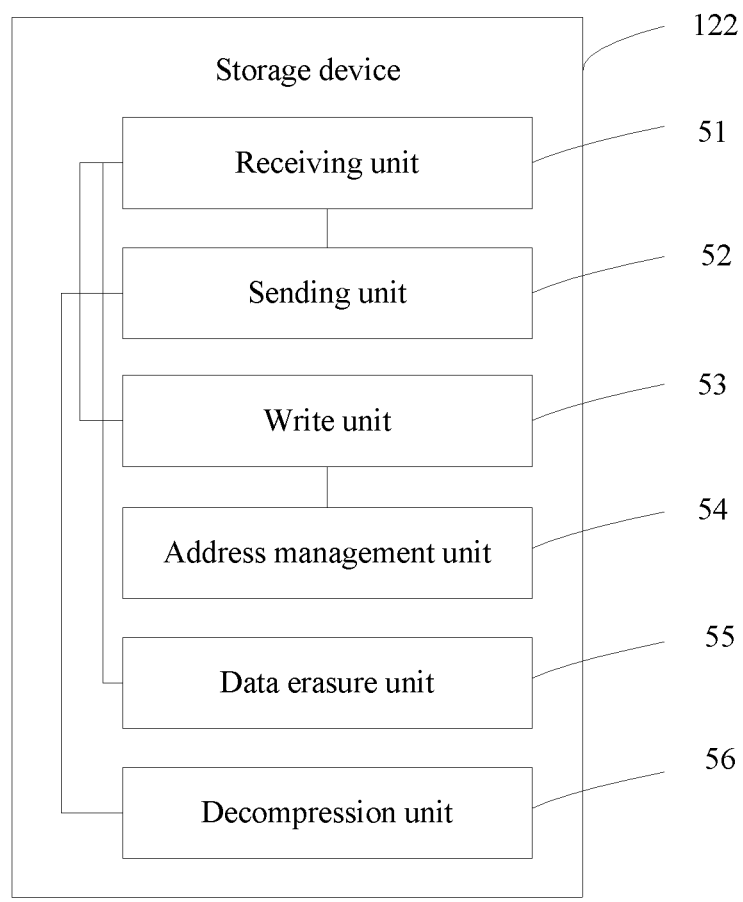
FIG. 5 is a schematic structural diagram of a storage device according to an embodiment of the present disclosure.

An embodiment of the present disclosure further provides a storage device 122 applied to a storage array 12. The storage array 12 further includes a storage controller 121. The storage device 122 is configured to implement corresponding steps in the foregoing method embodiment. As shown in FIG. 5, the storage device 122 includes a receiving unit 51, a sending unit 52, a write unit 53, and an address management unit 54.

The receiving unit 51 is configured to receive a first read instruction sent by the storage controller 121. The first read instruction includes a first logical address and a no-decompression flag.

First data is stored in a first physical address of the storage device 122, the first logical address is mapped to the first physical address, a length of the first logical address is equal to a length of second data, the first data is compressed data of the second data, a length of the first physical address is equal to the length of the first data, and an address of the storage array 12 is mapped to the first logical address.

The sending unit 52 is configured to send the first data to the storage controller 121 according to the first read instruction.

The receiving unit 51 is further configured to receive a write instruction sent by the storage controller 121. The write instruction includes a second logical address and the first data, and a length of the second logical address is equal to the length of the first data.

The write unit 53 is configured to write the first data into a second physical address.

The address management unit 54 is configured to establish a mapping relationship between the second logical address and the second physical address.

The storage device 122 sends compressed data to the storage controller 121 without decompressing the compressed data, and further, the storage device 122 does not need to re-compress written data such that data collation efficiency is improved.

According to the storage device 122, after the storage device 122 sends the first data to the storage controller 121, the storage controller 121 may assign the second logical address to the first data. The length of the second logical address is equal to a length of the second physical address that is actually occupied by the first data. Therefore, a physical address of the storage device 122 is made full use such that storage space utilization is improved.

Optionally, the receiving unit 51 is further configured to receive a data erasure instruction sent by the storage controller 121. The data erasure instruction includes the first logical address. The storage device 122 further includes a data erasure unit 55 configured to erase, according to the data erasure instruction, the first data stored in the first physical address. The address management unit 54 is further configured to delete a mapping relationship between the first logical address and the first physical address.

Optionally, the receiving unit 51 is further configured to receive a second read instruction sent by the storage controller 121. The second read instruction includes the second logical address and a decompression flag. The storage device further includes a decompression unit 56 configured to decompress the first data according to the second read instruction to obtain the second data. The sending unit 52 is further configured to send the second data to the storage controller 121. Optionally, a read instruction sent by the storage controller 121 to the storage device 122 includes the no-decompression flag only when data is collated. In another scenario, the read instruction sent by the storage controller 121 to the storage device 122 includes only a logical address of the storage device 122, for example, the first logical address or the second logical address. The storage device 122 decompresses the first data according to the other approaches operation to obtain the second data, and sends the second data to the storage controller 121. That is, the storage device 122 decompresses the first data by default. Optionally, the receiving unit 51 is further configured to receive a second read instruction sent by the storage controller 121. The second read instruction includes the second logical address.

It should be noted that, division for the units of the storage device is merely logical function division and may be other division in actual implementation. In addition, physical implementation of the foregoing functional units may have multiple types.

In addition, it may be clearly understood by a person skilled in the art that, for the purpose of convenient and brief description, for a specific working process of each unit of the foregoing described storage device, refer to a corresponding process in the foregoing method embodiment, and details are not described herein again.

Figure 6:
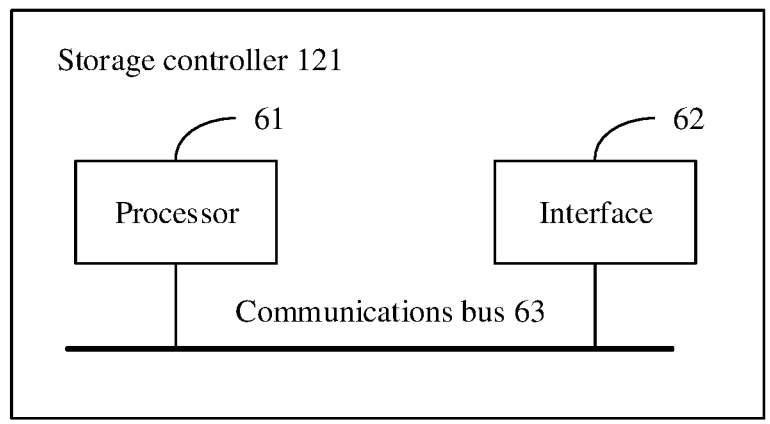
FIG. 6 is a schematic structural diagram of another storage controller according to an embodiment of the present disclosure.

An embodiment of the present disclosure further provides another storage controller 121 applied to a storage array 12. As shown in FIG. 6, the storage controller 121 includes a processor 61, an interface 62, and a communications bus 63. The processor 61 and the interface 62 communicate via the communications bus 63. The processor 61 is configured to execute corresponding steps in the foregoing embodiment of the present disclosure, and details are not described herein again.

The storage controller 121 may further include another component such as a memory, configured to store an instruction of the processor 61, and the other component is not shown in FIG. 6. In addition, a person skilled in the art should understand that an operation performed by the processor 61 may be completed in cooperation with another component. For ease of description, this is described as follows in this embodiment of the present disclosure. The processor 61 performs an operation in data collation. Further, the processor 61 in this embodiment of the present disclosure is configured to execute the corresponding steps in the foregoing embodiment of the present disclosure via the interface 62.

The processor 61 in this embodiment of the present disclosure may be a CPU. In addition, to save computation resources of a CPU, the processor 61 may be a field programmable gate array (FPGA) or other hardware to implement all operations in data collation performed by the storage controller 121 in this embodiment of the present disclosure. Alternatively, the processor 61 may be a CPU and an FPGA or other hardware, and the FPGA or other hardware and the CPU separately perform some operations in data collation performed by the storage controller 121 in this embodiment of the present disclosure. For ease of description, this is described as follows in this embodiment of the present disclosure. The processor 61 of the storage controller 121 implements an operation in data collation performed by the storage controller 121 in this embodiment of the present disclosure. For details, refer to corresponding description in the foregoing method embodiment, and the details are not described herein again.

Figure 7:
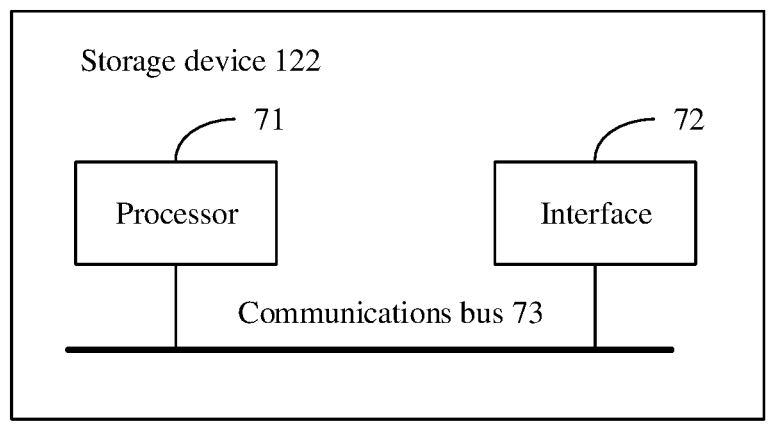
FIG. 7 is a schematic structural diagram of another storage device according to an embodiment of the present disclosure.

An embodiment of the present disclosure further provides another storage device 122 applied to a storage array 12. As shown in FIG. 7, the storage device 122 includes a processor 71, an interface 72, and a communications bus 73. The processor 71 and the interface 72 communicate via the communications bus 73. The processor 71 is configured to execute corresponding steps in the foregoing embodiment of the present disclosure, and details are not described herein again. Further, the processor 71 in this embodiment of the present disclosure is configured to execute the corresponding steps in the foregoing embodiment of the present disclosure via the interface 72.

The storage device 122 may further include another component such as a storage medium, configured to store data, and the other component is not shown in FIG. 7. In addition, a person skilled in the art should understand that an operation performed by the processor 71 may be completed in cooperation with another component. For ease of description, this is described as follows in this embodiment of the present disclosure. The processor 71 performs an operation in data collation.

The processor 71 in this embodiment of the present disclosure may be a CPU, or may be an FPGA or other hardware, or may be a CPU and an FPGA or other hardware. For ease of description, this is described as follows in this embodiment of the present disclosure. The processor 71 of the storage device 122 implements an operation in data collation performed by the storage device 122 in this embodiment of the present disclosure. For details, refer to corresponding description in the foregoing method embodiment, and the details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses or units, and may be implemented in electronic, mechanical, or other forms.

The units described as separate parts may or may not be physically separate. Parts displayed as units may or may not be physical units, and may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present disclosure. The foregoing storage medium includes any medium that can store data, such as a universal serial bus (USB) flash drive, a removable hard disk, a random access memory (RAM), a magnetic disk, or an optical disc.

What is claimed is:

1. A data collation method implemented by a storage controller in a storage array, wherein the data collation method comprises:
   sending, to a storage device in the storage array, a first read instruction comprising a first logical address, wherein the first read instruction further comprises a no-decompression flag only when the storage controller performs data collation, wherein the first logical address maps to a first physical address of the storage device, wherein the first physical address points to a first area in the storage device storing first data, wherein the first data comprise compressed data of second data, wherein an address of the storage array maps to the first logical address, and wherein the no-decompression flag instructs the storage device to not decompress the first data;
   receiving the first data from the storage device, wherein the storage controller receives the first data from the storage device in a compressed format;
   assigning a second logical address to the first data;
   sending to the storage device a write instruction comprising the second logical address and the first data;
   establishing a mapping relationship between the address of the storage array and the second logical address;
   sending to the storage device a data erasure instruction comprising the first logical address; and
   sending, to the storage device, a second read instruction comprising at least the second logical address, wherein the second read instruction further comprises a decompression flag when the storage controller sends the second read instruction due to a data read instruction from a server, and wherein the decompression flag instructs the storage device to decompress the first data to obtain the second data.

2. The method of claim 1, further comprising:
   marking the second logical address as an address for storing compressed data; and
   implementing the data collation method by performing data collation on only the address for storing the compressed data.

3. The method of claim 1, further comprising:
   receiving, from the server, the data read instruction comprising the address;
   sending, to the storage device according to the data read instruction, the second read instruction comprising the second logical address the decompression flag instructing the storage device to decompress the first data to obtain the second data;
   receiving, the second data from the storage device; and
   sending the second data to the server.

4. The method of claim 1, further comprising determining the first logical address as an address for storing uncompressed data when a length of the address of the storage array is equal to a length of the first logical address.

5. The data collation method of claim 1, wherein the first physical address points to the first area, and wherein the first area and the first data have a first length equal to a length of the first physical address.

6. A storage controller in a storage array, the storage controller comprising:
   a memory; and
   a processor coupled to the memory and configured to:
      send to a storage device in the storage array a first read instruction comprising a first logical address, wherein the first read instruction further comprises a no-decompression flag only when the storage controller performs data collation, wherein the first logical address maps to a first physical address of the storage device, wherein the first physical address points to a first area in the storage device storing first data, wherein the first data comprise compressed data of second data, wherein an address of the storage array maps to the first logical address, and wherein the no-decompression flag instructs the storage device to not decompress the first data during data collation;
      receive the first data from the storage device, wherein the storage controller receives the first data from the storage device in a compressed format;
      assign a second logical address to the first data;
      send to the storage device a write instruction comprising the second logical address and the first data;
      establish a mapping relationship between the address of the storage array and the second logical address;
      send to the storage device a data erasure instruction comprising the first logical address; and
      send, to the storage device, a second read instruction comprising at least the second logical address, wherein the second read instruction further comprises a decompression flag when the storage controller sends the second read instruction due to a data read instruction from a server, and wherein the decompression flag instructs the storage device to decompress the first data to obtain the second data.

7. The storage controller of claim 6, wherein the processor is further configured to mark the second logical address as an address for storing compressed data such that the storage controller implements a data collation procedure by performing data collation on only the address for storing the compressed data.

8. The storage controller of claim 6, wherein the processor is further configured to:
   receive from the server the data read instruction comprising the address of the storage array;

send, to the storage device according to the data read instruction, the second read instruction comprising the second logical address and the decompression flag instructing the storage device to decompress the first data to obtain the second data;

receive the second data from the storage device; and send the second data to the server.

9. The storage controller of claim 6, wherein the processor is further configured to:

determine the first logical address as an address for storing uncompressed data when a length of the address of the storage array is equal to a length of the first logical address; and determine the second logical address as an address for storing compressed data when the address of the storage array is not equal to the second logical address.

10. A storage device in a storage array, the storage device comprising:

a memory; and a processor coupled to the memory and configured to:

receive, from a storage controller in the storage array, a first read instruction comprising a first logical address and a no-decompression flag, wherein the first logical address maps to a first physical address of the storage device, wherein the first physical address points to a first area in the storage device storing first data, wherein the first data comprise compressed data of second data, wherein an address of the storage array maps to the first logical address, and wherein the no-decompression flag instructs the storage device to not decompress the first data;

send the first data to the storage controller according to the first read instruction, wherein the storage device sends the first data to the storage controller without decompressing the first data;

receive from the storage controller a write instruction comprising a second logical address and the first data;

write the first data into a second area pointed to by a second physical address;

establish a mapping relationship between the second logical address and the second physical address;

receive from the storage controller a data erasure instruction comprising the first logical address; and receive from the storage controller a second read instruction comprising at least the second logical address, wherein the first read instruction comprises the no-decompression flag only when the storage controller performs data collation, wherein the second read instruction further comprises a decompression flag when the storage controller sends the second read instruction due to a data read instruction from a server, and wherein the decompression flag instructs the storage device to decompress the first data to obtain the second data.

11. The storage device of claim 10, wherein the processor is further configured to:

erase, according to the data erasure instruction, the first data stored in the first physical address; and delete a mapping relationship between the first logical address and the first physical address.

12. The storage device of claim 10, wherein the processor is further configured to:

receive from the storage controller the second read instruction comprising the second logical address and the decompression flag instructing the storage device to decompress the first data to obtain the second data;

decompress the first data according to the second read instruction to obtain the second data; and send the second data to the storage controller.

13. A storage array comprising:

a storage controller configured to:

send a first read instruction, receive first data, assign a second logical address to the first data, send a write instruction comprising the second logical address and the first data, establish a mapping relationship between an address of the storage array and the second logical address, and send a data erasure instruction comprising a first logical address; and a storage device configured to:

receive the first read instruction from the storage controller, wherein the first read instruction comprises the first logical address and a no-decompression flag, wherein the first logical address maps to a first physical address of the storage device, wherein the first physical address points to a first area in the storage device storing first data, wherein the first data comprise compressed data of second data, wherein the address of the storage array maps to the first logical address, and wherein the no-decompression flag instructs the storage device to not decompress the first data, send the first data to the storage controller according to the first read instruction, wherein the storage device sends the first data to the storage controller without decompressing the first data, receive the write instruction from the storage controller, write the first data into a second area pointed to by a second physical address, establish a mapping relationship between the second logical address and the second physical address, receive the data erasure instruction from the storage controller; and receive from the storage controller a second read instruction comprising at least the second logical address, wherein the first read instruction comprises the no-decompression flag only when the storage controller performs data collation, wherein the second read instruction further comprises a decompression flag when the storage controller sends the second read instruction due to a data read instruction from a server, and wherein the decompression flag instructs the storage device to decompress the first data to obtain the second data.

14. The storage array of claim 13, wherein the storage controller is further configured to mark the second logical address as an address for storing compressed data such that the storage controller implements a data collation procedure by performing data collation on only the address for storing the compressed data.

15. The storage array of claim 13, wherein the storage device is further configured to:

erase, according to the data erasure instruction, the first data stored in the first physical address; and delete a mapping relationship between the first logical address and the first physical address.

16. The storage array of claim 13, wherein the storage controller is further configured to:

receive, from a server, a data read instruction comprising the address of the storage array;

send, to the storage device according to the data read instruction, a second read instruction comprising the second logical address and a decompression flag instructing the storage device to perform decompression on the first data to obtain the second data, receive the second data from the storage device; and send the second data to the server.

17. The storage array of claim 13, wherein before sending the first read instruction to the storage device, the storage controller is further configured to determine the first logical address as an address for storing compressed data.

18. The storage array of claim 16, wherein the storage device is further configured to:

receive the second read instruction from the storage controller;

decompress the first data according to the second read instruction to obtain the second data; and send the second data to the storage controller.

19. The data collation method of claim 5, wherein the first logical address points to a second area in the storage device, and wherein the second area and the second data have a second length.

20. The data collation method of claim 19, wherein the second logical address points to a third area in the storage device, and wherein the third area has the first length.

21. The data collation method of claim 5, wherein the storage controller assigns the second logical address to the first data according to the first length of the first data, wherein the first length is equal to a length of the second logical address, and wherein the length of the second logical address is equal to a length of the second physical address that is occupied by the first data.

* * * * *